US009800453B2

United States Patent
Taleb et al.

(10) Patent No.: US 9,800,453 B2
(45) Date of Patent: Oct. 24, 2017

(54) METHOD AND APPARATUS FOR PROVIDING SPEECH CODING COEFFICIENTS USING RE-SAMPLED COEFFICIENTS

(71) Applicant: Huawei Technologies Co., Ltd., Shenzhen, Guangdong (CN)

(72) Inventors: Anisse Taleb, Stockholm (SE); Jianfeng Xu, Shenzhen (CN); David Virette, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 395 days.

(21) Appl. No.: 13/957,078

(22) Filed: Aug. 1, 2013

(65) Prior Publication Data
US 2014/0012571 A1  Jan. 9, 2014

Related U.S. Application Data

(63) Continuation of application No. PCT/CN2011/070884, filed on Feb. 1, 2011.

(51) Int. Cl.
*G10L 19/08* (2013.01)
*G10L 19/12* (2013.01)
(Continued)

(52) U.S. Cl.
CPC .......... *H04L 29/0651* (2013.01); *G10L 25/06* (2013.01); *G10L 25/12* (2013.01); *G10L 19/06* (2013.01); *G10L 19/08* (2013.01)

(58) Field of Classification Search
CPC .......... G10L 19/08; G10L 19/12; G10L 25/06
(Continued)

(56) References Cited

U.S. PATENT DOCUMENTS

| 4,216,354 A | * | 8/1980 | Esteban et al. ............... 704/229 |
| 5,619,004 A | * | 4/1997 | Dame ............................ 84/616 |

(Continued)

FOREIGN PATENT DOCUMENTS

| CN | 1342968 A | 4/2002 |
| CN | 101023472 A | 8/2007 |

(Continued)

OTHER PUBLICATIONS

Kim, et al. "Use of spectral autocorrelation in spectral envelope linear prediction for speech recognition." Speech and Audio Processing, IEEE Transactions on 7.5, Sep. 1999, pp. 533-541.*

(Continued)

*Primary Examiner* — James Wozniak
(74) *Attorney, Agent, or Firm* — Leydig, Voit & Mayer, Ltd.

(57) ABSTRACT

A method and apparatus for providing signal processing coefficients for processing an input signal at a predetermined signal processing sampling rate, wherein the input signal is received at an input signal sampling rate, the method comprising the steps of computing a correlation or covariance function based on the received input signal at the input signal sampling rate to provide correlation or covariance coefficients at the input signal sampling rate, re-sampling the computed correlation or covariance coefficients having the input signal sampling rate to provide correlation or covariance coefficients at the predetermined signal processing sampling rate, and calculating the signal processing coefficients based on the correlation or covariance coefficients at the predetermined signal processing sampling rate.

15 Claims, 10 Drawing Sheets

(51) Int. Cl.
*G10L 25/06* (2013.01)
*H04L 29/06* (2006.01)
*G10L 25/12* (2013.01)
*G10L 19/06* (2013.01)

(58) Field of Classification Search
USPC .............................. 704/201, 216–217, 219
See application file for complete search history.

(56) References Cited

U.S. PATENT DOCUMENTS

| | | | |
|---|---|---|---|
| 6,574,593 B1* | 6/2003 | Gao et al. | 704/222 |
| 6,604,070 B1* | 8/2003 | Gao et al. | 704/222 |
| 2002/0072905 A1* | 6/2002 | White | G10L 15/30 |
| | | | 704/231 |
| 2003/0093279 A1 | 5/2003 | Malah et al. | |
| 2003/0177002 A1* | 9/2003 | Chen | 704/207 |
| 2004/0083095 A1* | 4/2004 | Ashley et al. | 704/219 |
| 2004/0102969 A1* | 5/2004 | Manjunath et al. | 704/229 |
| 2004/0120361 A1 | 6/2004 | Yu et al. | |
| 2004/0133427 A1* | 7/2004 | Alattar et al. | 704/273 |
| 2005/0143984 A1* | 6/2005 | Makinen et al. | 704/219 |
| 2005/0159942 A1* | 7/2005 | Singhal | 704/219 |
| 2006/0041753 A1* | 2/2006 | Haitsma | G10H 1/0058 |
| | | | 713/176 |
| 2007/0179783 A1* | 8/2007 | Manjunath et al. | 704/230 |
| 2007/0271092 A1* | 11/2007 | Ehara et al. | 704/209 |
| 2007/0296614 A1* | 12/2007 | Lee et al. | 341/50 |
| 2008/0033585 A1* | 2/2008 | Zopf | 700/94 |
| 2008/0046233 A1* | 2/2008 | Chen | G10L 19/005 |
| | | | 704/211 |
| 2008/0059166 A1* | 3/2008 | Ehara | 704/230 |
| 2008/0126085 A1* | 5/2008 | Morii | G10L 19/07 |
| | | | 704/222 |
| 2008/0215330 A1* | 9/2008 | Harma et al. | 704/265 |
| 2008/0249766 A1* | 10/2008 | Ehara | G10L 19/24 |
| | | | 704/203 |
| 2009/0063139 A1* | 3/2009 | Tammi et al. | 704/207 |
| 2009/0094023 A1* | 4/2009 | Sung et al. | 704/219 |
| 2009/0110208 A1* | 4/2009 | Choo et al. | 381/71.1 |
| 2009/0261994 A1 | 10/2009 | Petrov | |
| 2009/0299737 A1* | 12/2009 | Ghenania et al. | 704/219 |
| 2010/0145688 A1* | 6/2010 | Sung et al. | 704/208 |
| 2010/0174534 A1* | 7/2010 | Vos | 704/207 |
| 2011/0040558 A1* | 2/2011 | Ehara | 704/222 |
| 2011/0301946 A1* | 12/2011 | Satoh et al. | 704/219 |
| 2011/0311058 A1* | 12/2011 | Oh et al. | 381/2 |
| 2013/0231926 A1* | 9/2013 | Gigi | G10L 25/90 |
| | | | 704/207 |

FOREIGN PATENT DOCUMENTS

| | | |
|---|---|---|
| CN | 101714379 A | 5/2010 |
| EP | 1130833 A2 | 9/2001 |
| EP | 1785985 A1 | 5/2007 |

OTHER PUBLICATIONS

Laurent, et al. "A robust 2400 bps subband LPC vocoder." Acoustics, Speech, and Signal Processing, 1995. ICASSP-95., 1995 International Conference on. vol. 1. IEEE, May 1995, pp. 500-503.*
Ehara, Hiroyuki, et al. "Predictive VQ for bandwidth scalable LSP quantization." Proceedings.(ICASSP'05). IEEE International Conference on Acoustics, Speech, and Signal Processing, 2005.. vol. 1. IEEE, Mar. 2005, pp. 137-140.*
Ehara, Hiroyuki, Toshiyuki Morii, and Koji Yoshida. "Predictive vector quantization of wideband LSF using narrowband LSF for bandwidth scalable coders." Speech communication 49.6, Jun. 2007, pp. 490-500.*
Ehara, Hiroyuki, et al. "Design of bandwidth scalable LSF quantization using interframe and intraframe prediction." Interspeech. Sep. 2005, pp. 1493-1496.*
International Search Report in corresponding PCT Patent Application No. PCT/CN2011/070884 (Nov. 17, 2011).
Written Opinion of the International Searching Authority in corresponding PCT Patent Application No. PCT/CN2011/070884 (Nov. 17, 2011).
3GPP TS 26.190—3$^{rd}$ Generation Partnership Project; Technical Specification Group Services and System Aspects; Speech codec speech processing functions; Adaptive Multi-Rate—Wideband (AMR-WB) speech codec; Transcoding functions (Release 8), Version 8.0.0, 3$^{rd}$ Generation Partnership Project, Valbonne, France (Dec. 2008).
Schroeder et al., "Code-Excited Linear Prediction (CELP): High-Quality Speech At Very Low Bit Rates," IEEE, New York, New York (1985).
Kroon et al., "Ptich Predictors With High Temporal Resolution," IEEE, New York, New York (1990).

* cited by examiner

METHOD AND APPARATUS FOR PROVIDING SPEECH CODING COEFFICIENTS USING RE-SAMPLED COEFFICIENTS

CROSS-REFERENCE TO RELATED APPLICATION

This application is a continuation of International Patent Application No. PCT/CN2011/070884, filed on Feb. 1, 2011, which is hereby incorporated by reference in its entirety.

TECHNICAL FIELD

The invention relates to a method and an apparatus for providing signal processing coefficients for processing an input signal at a predetermined signal processing sampling rate.

BACKGROUND

In conventional audio and speech digital signal communication systems the signal can be compressed by an encoder. A compressed bit stream can then be packetized and sent to a decoder through a communication channel frame by frame. The system comprising an encoder and decoder is also called a codec device. Speech audio compression is used to reduce the number of bits that represent the submitted speech or audio signal thereby reducing the bit rate of the transmitted signal.

Different speech coding schemes are known. For instance, a coding algorithm such as Linear Predictive Coding LPC, wave form coding or sub-band/transform coding can be employed. Depending on the specific application the algorithmic delay of the employed coding algorithm is more or less relevant. For broadcast applications a delay introduced by the codec does not have an impact and usually the introduced delay is quite high and can be in a range between 100 ms and 300 ms. In conventional conversational applications and particularly for VoIP, the delay constraint is an important factor when designing a codec. In a speech audio codec which is based on Linear Predictive Coding a linear prediction filter can be used to estimate a frequency envelope. The principle behind the use of Linear Predictive Coding is to minimize a sum of the squared differences between an input signal and an estimated signal over a predetermined time period of for example 5 ms, 10 ms, 20 ms or 40 ms etc. The coefficients of the linear prediction filter can be computed using a covariance or auto-correlation function based on a windowed version of the input signal to be encoded. Usually, the employed window takes into account part of the past samples in addition to the current samples of the input signal to be encoded. The samples which are encoded are usually centred on the employed window. Therefore, the window is applied on past samples as well as on the current encoded frame as well as on future samples which are also called look-ahead.

In some conventional Linear Predictive Coding (LPC) based encoders the LPC estimation is done after a re-sampling has been performed. For instance, in speech and audio coding algorithms targeting a wideband WB or super wideband SWB the bandwidth can be split in order to give more importance, i.e. a higher bit rate, to the low frequency part which is perceptually more relevant because the human auditory system is more sensible in the low frequency part of the signal spectrum. For example, according to G.729.1 the audio bandwidth is first split in two frequency bands of 0-4 kHz and 4-8 kHz prior to a CELP encoding (Code Excited Linear Prediction) in the first frequency band and a bandwidth extension in the second frequency band.

FIG. 1 shows a block diagram of a conventional encoding arrangement comprising an LPC estimation unit for providing LPC filter coefficients to a speech processing unit. As can be seen in FIG. 1 the received digital input audio signal can comprise frames F which are consisting of sub-frames SF. In the shown example of FIG. 1 the frame F consists of 4 sub-frames SF0, SF1, SF2, SF3 wherein the frame F can last for example 20 ms. Accordingly, each sub-frame can have the length of 5 ms comprising for example 80 samples. The received digital input audio signal S1 is applied to a re-sampling filter RSF performing a re-sampling of the input signal. The input signal S1 is received at the input signal sampling rate f1 of about e.g. 16 kHz and applied to the re-sampling filter which re-samples the received signal with a predetermined ratio of e.g. 4/5. In this way, the input signal sampling rate f1 of e.g. 16 kHz is downsampled to a sampling rate of 12.8 kHz. Accordingly, a frame F consisting of 4 sub-frames SF can comprise 4×80 samples=320 samples and is downsampled to a frame F' having 256 samples. Accordingly, the number of samples in the down-sampled frame is a power of 2 and allows to use a more efficient speech processing algorithm. The re-sampled signal provided by the re-sampling filter RSF is split and applied to the speech processing unit SPU as shown in FIG. 1 and to a LPC estimation unit which provides LPC filter coefficients for the speech processing unit SPU, or in other words is applied to both, to the speech processing unit SPU and to a LPC estimation unit as shown in FIG. 1. Accordingly, the LPC estimation is done after re-sampling. For example, the LPC filter coefficients are calculated by the LPC estimation unit by using a "Levinson-Durbin" algorithm based on the auto-correlation signal of the windowed input signal. As illustrated in FIG. 1 the window is applied also on future samples of the next frame, i.e. the LPC look-ahead.

The conventional processing arrangement as shown in FIG. 1 comprises a re-sampling filter RSF. The drawback of providing the re-sampling stage or re-sampling filter RSF is that by providing this additional filtering stage an additional delay is introduced. As can be seen in FIG. 1 the processing delay caused by the re-sampling stage or re-sampling filter is caused in the critical signal path. As illustrated in FIG. 1 the critical path in terms of delay includes a re-sampling filter delay as well as the LPC look-ahead.

The re-sampling filter RSF is for instance a linear phase FIR filter having the following transfer function:

$$H(w) = \sum_{k=0}^{N-1} c_k \cdot e^{-iwk}$$

where C0, C1 . . . CN−1 is the coefficient sequence, the introduced filter delay is (N−1)/2. For conventional conversational applications, in particular for VoIP, this introduced delay reduces the performance of the system.

Accordingly, it is an object of the present invention to provide a method and an apparatus for providing signal processing coefficients to reduce the introduced delay of the critical signal path.

SUMMARY

According to a first aspect of the present invention a method for providing signal processing coefficients for processing an input signal at a predetermined signal processing sampling rate is provided, wherein the input signal is received at an input signal sampling rate, and wherein the method comprises the steps of:

(a) computing a correlation or covariance function based on the received input signal at the input signal sampling rate to provide correlation or covariance coefficients at the input signal sampling rate, (b) re-sampling the computed correlation or covariance coefficients having the input signal sampling rate to provide correlation or covariance coefficients at the predetermined signal processing sampling rate and (c) calculating the signal processing coefficients based on the correlation or covariance coefficients at the predetermined signal processing sampling rate.

Accordingly, with the method according to the first aspect of the present invention the correlation or covariance function is directly computed for the received input signal and not on the basis of a re-sampled signal. With the method for providing signal processing coefficients according to the first aspect of the present invention the computed correlation or covariance coefficients having the input signal sampling rate are then re-sampled to provide correlation or covariance coefficients at a predetermined signal processing sampling rate. As it is not necessary to re-sample the look-ahead portion of the signal for encoding a current signal frame an overall delay can be reduced with the method according to the first aspect of the present invention by only filtering the frame which is processed by the speech processing unit. Accordingly, with the method for providing a signal processing coefficients according to the first aspect of the present invention a re-sampling delay which is usually lower than the length of a look-ahead is introduced in parallel to the look-ahead and not in addition. Therefore, the re-sampling delay is absorbed with the method for providing signal processing coefficients according to the first aspect of the present invention into the look-ahead time portion thus reducing the overall introduced delay in the critical signal path.

In a possible implementation of the method for providing signal processing coefficients according to the first aspect of the present invention the received input signal comprises an actual signal portion and a look-ahead signal portion.

In a possible implementation of the method for providing signal processing coefficients according to the first aspect of the present invention the step of calculating the signal processing coefficients comprises calculating the signal processing coefficients for the actual signal portion.

In a possible implementation of the method for providing signal processing coefficients according to the first aspect of the present invention the computed correlation or covariance coefficients and the re-sampled correlation or covariance coefficients comprise the actual signal portion and the look-ahead signal portion of the received input signal. In other words, the computed correlation or covariance coefficients have been computed using the input signal comprising the actual signal portion, e.g. an actual frame, and a look-ahead signal portion, and the re-sampled correlation or covariance coefficients also comprise information about the actual signal portion and the look-ahead signal portion of the received input signal.

In a further possible implementation of the method for providing signal processing coefficients according to the first aspect of the present invention the signal processing coefficients comprise Linear Predictive Coding filter coefficients.

In a further possible implementation of the method for providing signal processing coefficients according to the first aspect of the present invention the signal processing coefficients comprise a pitch lag of the input signal.

In a possible implementation of the method for providing signal processing coefficients according to the first aspect of the present invention the re-sampling is performed by a re-sampling filter with a re-sampling factor.

In a possible implementation of the method for providing signal processing coefficients according to the first aspect of the present invention the re-sampling filter is formed by a ratio between the signal processing sampling rate and the input signal sampling rate.

In a possible implementation of the method for providing signal processing coefficients according to the first aspect of the present invention the re-sampling filter performs a downsampling of the received input signal.

In a possible alternative implementation of the method for providing signal processing coefficients according to the first aspect of the present invention the re-sampling filter performs an upsampling of the received input signal.

In a still further possible implementation of the method for providing signal processing coefficients according to the first aspect of the present invention the re-sampling filter performs a downsampling or an up sampling of the received input signal with a fixed re-sampling factor.

In a possible further alternative implementation of the method for providing signal processing coefficients according to the first aspect of the present invention the re-sampling filter performs a downsampling or upsampling of the received input signal with a configurable re-sampling factor.

In a possible implementation of the method according to the present invention the configurable re-sampling factor is selected from a group of downsampling factors comprising:

$$4/15, 2/5, 4/5, 1/6, 1/4, 1/2.$$

In a possible implementation of the method for providing signal processing coefficients according to the first aspect of the present invention the re-sampling filter is formed by a zero phase re-sampling filter.

In a possible implementation of the method for providing signal processing coefficients according to the first aspect of the present invention the computed correlation or covariance coefficients are filtered by a pre-emphasis filter before being re-sampled by the re-sampling filter.

In a possible implementation of the method for providing signal processing coefficients according to the first aspect of the present invention the LPC filter coefficients are calculated by means of a filter coefficient calculating unit performing a filter coefficient calculation algorithm.

In a possible implementation of the method for providing signal processing coefficients according to the first aspect of the present invention the filter coefficients calculating algorithm is formed by a Levinson-Durbin algorithm.

In a further possible implementation of the method for providing signal processing coefficients according to the first aspect of the present invention the filter coefficients calculating algorithm is a Burg algorithm.

In a further possible implementation of the method for providing signal processing coefficients according to the first aspect of the present invention the calculated LPC filter coefficients are provided to adapt a linear prediction filter.

According to a possible implementation of the method for providing signal processing coefficients according to the first aspect of the present invention the linear prediction filter is used by a speech processing unit for performing a speech processing function to the input signal or a re-sampled input signal. The re-sampled input signal may be, for example, a re-sampled version of the received input signal. The re-sampled version of the received input signal may be obtained by re-sampling the received input signal using the same re-sampling factor as used for the re-sampling of the computed correlation or covariance coefficients.

In a still further possible implementation of the method for providing signal processing coefficients according to the first aspect of the present invention the speech processing unit is formed by a Code Excited Linear Prediction, CELP, encoder.

In a further possible implementation of the method for providing signal processing coefficients according to the first aspect of the present invention the speech processing unit is formed by a transform coded excitation, TCX, encoder.

In a possible implementation of the method for providing signal processing coefficients according to the first aspect of the present invention the received input signal is a digital audio signal comprising signal frames each consisting of a predetermined number of samples.

The invention further provides according to a second aspect an apparatus for providing signal processing coefficients for processing an input signal at a predetermined signal processing sampling rate, wherein the apparatus is adapted to receive the input signal at an input signal sampling rate, that apparatus comprising:

(a) a computing unit adapted to compute a correlation or covariance function based on the received input signal at the input signal sampling rate to provide correlation or covariance coefficients at the input signal sampling rate, (b) a re-sampling unit adapted to re-sample the computed correlation or covariance coefficients having the input signal sampling rate to provide correlation or covariance coefficients at the predetermined signal processing sampling rate; and (c) a calculation unit adapted to calculate the signal processing coefficients based on the correlation or covariance coefficients at the predetermined signal processing sampling rate.

In a possible implementation of the apparatus for providing signal processing coefficients according to the second aspect of the present invention the calculation unit is provided for calculating Linear Predictive Coding, LPC, filter coefficients on the basis of the correlation or covariance coefficients.

In a further possible embodiment of the apparatus for providing signal processing coefficients according to the second aspect of the present invention the calculation unit is provided for calculating a pitch lag on the basis of the correlation or covariance coefficients.

The invention further provides a signal processing device according to a third aspect wherein said signal processing device comprises an apparatus for providing signal processing coefficients for processing an input signal at a predetermined signal processing sampling rate, wherein the apparatus is adapted to receive the input signal at an input signal sampling rate, and wherein the apparatus comprises:

(a) a computing unit for computing a correlation or covariance function based on the received input signal at an input signal sampling rate to provide correlation or covariance coefficients at the input signal sampling rate, (b) a re-sampling unit for re-sampling the computed correlation or covariance coefficients having the input signal sampling rate to provide correlation or covariance coefficients at the predetermined signal processing sampling rate; and (c) a calculation unit for calculating signal the processing coefficients based on the correlation or covariance coefficients at the predetermined signal processing sampling rate;

wherein said signal processing device further comprises:

a speech processing unit for performing a speech processing function to said input signal.

In a possible implementation of the signal processing device according to the third aspect of the present invention the speech processing unit performs a speech processing function to said input signal in response to the calculated Linear Predictive Coding LPC filter coefficients.

In a still further possible implementation of the signal processing device according to the third aspect of the present invention the speech processing unit performs a speech processing function to said input signal in response to the calculated pitch lag.

In a possible implementation of the signal processing device according to the third aspect of the present invention the speech processing unit is formed in an exemplary embodiment by a speech encoder performing a speech encoding of the input signal.

In a possible implementation of the signal processing device according to the third aspect of the present invention the signal processing device receives as an input signal a digital audio signal provided by an audio signal source connected to said signal processing device.

BRIEF DESCRIPTION OF DRAWINGS

In the following possible implementations of the method and apparatus for providing signal processing coefficients are described in detail with respect to the enclosed figures.

DESCRIPTION OF EMBODIMENTS

Figure 2:
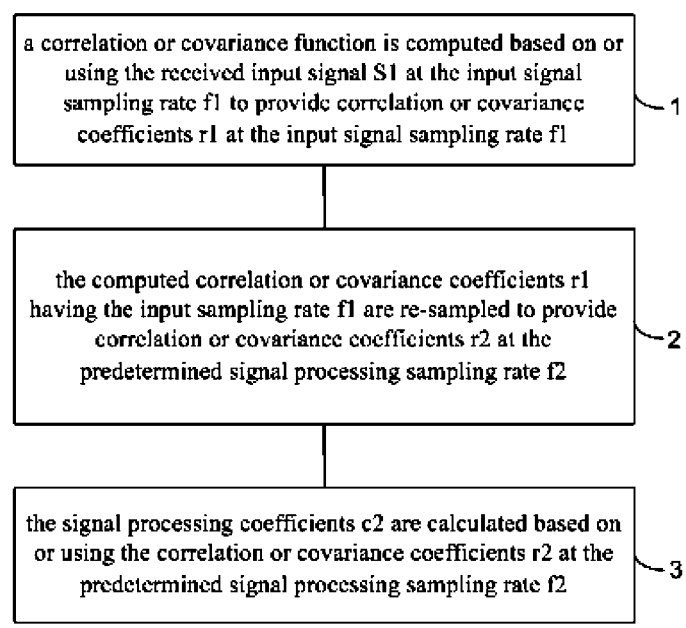
FIG. 2 shows a flowchart for illustrating a possible implementation of a method for providing signal processing coefficients according to a first aspect of the present invention.

As can be seen from the flowchart in FIG. 2 a method for providing signal processing coefficients for processing an input signal according to a first aspect of the present invention can comprise in an exemplary implementation three steps: step 1, step 2, step 3. The method provides signal processing coefficients for processing an input signal at a predetermined signal processing sampling rate f2 wherein the input signal S1 is received at an input signal sampling rate f1.

In a first step 1 a correlation or covariance function is computed based on or using the received input signal S1 at the input signal sampling rate f1 to provide correlation or covariance coefficients r1 at the input signal sampling rate f1.

In a further step 2 the computed correlation or covariance coefficients r1 having the input sampling rate f1 are re-sampled to provide correlation or covariance coefficients r2 at the predetermined signal processing sampling rate f2.

In a further step 3 the signal processing coefficients c2 are calculated based on or using the correlation or covariance coefficients r2 at the predetermined signal processing sampling rate f2.

The received input signal S1 for which a correlation or covariance function is computed in step 1 can comprise an actual signal portion and a look-ahead signal portion. In step 3 the calculating of the signal processing coefficients c2 comprises the calculation of the signal processing coefficients for the actual signal portion. The computed correlation or covariance coefficients r1 and the re-sampled correlation or covariance coefficients r2 comprise the actual signal portion and the look-ahead signal portion.

In a possible implementation the signal processing coefficients c2 calculated in step 3 can comprise Linear Predictive Coding, LPC, filter coefficients. Furthermore, in a possible implementation the signal processing coefficients c2 calculated in step 3 can comprise a pitch lag of the input signal S1.

The re-sampling in step 2 can be performed in a possible implementation by a re-sampling filter with a re-sampling factor. This re-sampling factor can be formed by a ratio between the signal processing sampling rate f2 and the input signal sampling rate f1 of the input signal S1. In a possible implementation the re-sampling performed by the re-sampling filter in step 2 can be a downsampling of the received input signal S1. In an alternative embodiment the re-sampling performed by the re-sampling filter in step 2 is an upsampling of the received input signal S1. In a possible implementation of the method for providing signal processing coefficients according to the first aspect of the present invention the employed re-sampling factor is a fixed re-sampling factor. In an alternative implementation of the method for providing signal processing coefficients according to the first aspect of the present invention the re-sampling factor provided by the re-sampling filter in step 2 is a configurable re-sampling factor. In a possible implementation this configurable re-sampling factor can be selected from a group of downsampling factors. This group of downsampling factors can comprise in a possible exemplary embodiment the following values:

$$4/15, 2/5, 4/5, 1/6, 1/4, 1/2$$   I.

Other ratios are possible as well depending on the specific application. The re-sampling filter employed for re-sampling computed correlation or covariance coefficients in step 2 can be formed in a possible implementation by a zero phase re-sampling filter.

In a further possible implementation of the method for providing signal processing coefficients according to the first aspect of the present invention the calculated computed correlation or covariance coefficients r1 computed in step 1 are filtered by a pre-emphasis filter before being re-sampled by the re-sampling filter in step 2. By employing a pre-emphasis filter before re-sampling the speech quality can be improved. By employing a pre-emphasis filter it is for example possible to emphasise higher frequencies within the signal. In a possible exemplary implementation of the method for providing signal processing coefficients the calculated signal processing coefficients c2 calculated in step 3 are calculated by means of a filter coefficient calculating unit. This filter coefficients calculating unit can perform a filter coefficient calculation algorithm. In a possible implementation this filter coefficient calculation algorithm comprises a Levinson-Durbin algorithm. In a further possible implementation the employed filter coefficients calculation algorithm is a Burg algorithm.

In a possible implementation of the method for providing signal processing coefficients according to the first aspect of the present invention as shown in FIG. 2 the calculated LPC filter coefficients calculated in step 3 are provided to adapt a linear prediction coding filter, LPC filter, used by a speech processing unit for performing a speech processing function of the received input signal S1.

This speech processing unit can be formed in a possible implementation by a Code Excited Linear Prediction (CELP) encoder. In a possible alternative implementation the speech processing unit can be formed by a Transform Coded Excitation (TCX) encoder. The received input signal processed by the method for providing signal processing coefficients according to the first aspect of the present invention can be a digital audio signal comprising signal frames each consisting of a predetermined number of samples.

With the method for providing signal processing coefficients for processing an input signal S1 according to the present invention the correlation or covariance function is computed directly based on the received input signal S1 before performing a re-sampling in step 2.

Figure 3:
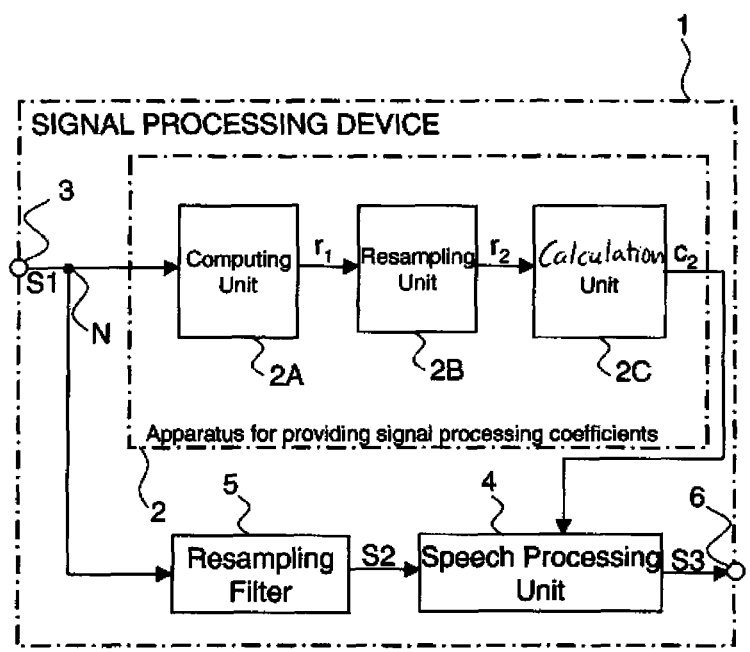
FIG. 3 shows a block diagram of a possible implementation of an apparatus for providing signal processing coefficients according to a second aspect of the present invention.

FIG. 3 shows a block diagram of a signal processing device 1 comprising an apparatus 2 for providing signal processing coefficients at a predetermined signal processing sampling rate according to a second aspect of the present invention. As can be seen in FIG. 3 the apparatus 2 for providing signal processing coefficients at a predetermined signal processing sampling rate comprises a computing unit 2A, a re-sampling unit 2B and a calculation unit 2C. The computing unit 2A receives an input signal S1 applied to an input terminal 3 of the signal processing device 1. The received input signal S1 can be a digital audio signal comprising signal frames wherein each signal frame F consists of a predetermined number of samples. The received input signal S1 comprises an input signal sampling rate f1. The computing unit 2A of the apparatus 2 for providing signal processing coefficients as shown in the implementation of FIG. 3 is provided for computing a correlation or covariance function based on the received input signal S1 at an input signal sampling rate f1 to provide correlation or covariance coefficients r1. The output of the computing unit 2A is connected to an input of the re-sampling unit 2B as shown in FIG. 3. The re-sampling unit 2B is provided for re-sampling the computed correlation or covariance coefficients r1 having the input signal sampling rate f1 to provide signal processing coefficients r2 at the predetermined signal processing sampling rate f2 adapted for signal processing of a re-sampled input signal S2, e.g. a re-sampled version S2 of the received input signal S1.

The apparatus 2 for providing signal processing coefficients c2 further comprises in the shown implementation a calculation unit 2C for calculating the signal processing coefficients c2 based on the correlation or covariance coefficients r2 at the predetermined signal processing sampling rate f2. The calculated signal processing coefficients c2 are applied as shown in FIG. 3 to a speech processing unit 4 of the signal processing device 1. The speech processing unit 4 further receives the re-sampled input signal S2 from a re-sampling filter 5 of the signal processing device 1. As can be seen from the block diagram shown in FIG. 3 the received input signal S1 is split at a node N and applied directly to the apparatus 2 for providing signal processing coefficients c2 without being re-sampled. The received input signal S1 is also applied in parallel to a re-sampling filter 5 performing the re-sampling of the received input signal S1 to obtain the re-sampled version of the input signal S2, wherein the re-sampled input signal S2 is applied to an input of the speech processing unit 4. The speech processing unit 4 performs a speech processing function to the received re-sampled input signal S2 provided by the re-sampling filter 5 as shown in FIG. 3. The output signal S3 of the speech processing unit 4 is applied to an output terminal 6 of the signal processing device 1.

In a possible implementation of the apparatus 2 for providing signal processing coefficients according to the second aspect of the present invention the calculation unit 2C is provided for calculating Linear Predictive Coding filter coefficients which are applied to the speech processing unit 4. The speech processing unit 4 performs a speech processing function to the re-sampled input signal S2 provided by the re-sampling filter 5 in response to the calculated Linear Predictive Coding LPC filter coefficients $C_2$ received from the apparatus 2. The re-sampling filter 5 is adapted to use or apply, for example, the same re-sampling factor as the re-sampling unit 2B.

In an alternative implementation the calculation unit 2C of the apparatus 2 is provided for calculating a pitch lag on the basis of the correlation or covariance coefficients c2. In this possible implementation the speech processing unit 4 performs the speech processing function of the re-sampled input signal S1 in response to the calculated pitch lag. The speech processing unit 4 can provide different speech processing functions. In a possible exemplary implementation the speech processing unit 4 performs a speech encoding of the re-sampled input signal S2. Further, speech or audio processing functions can be performed in alternative implementations by the speech processing unit 4 as well depending on the application.

Figure 4:
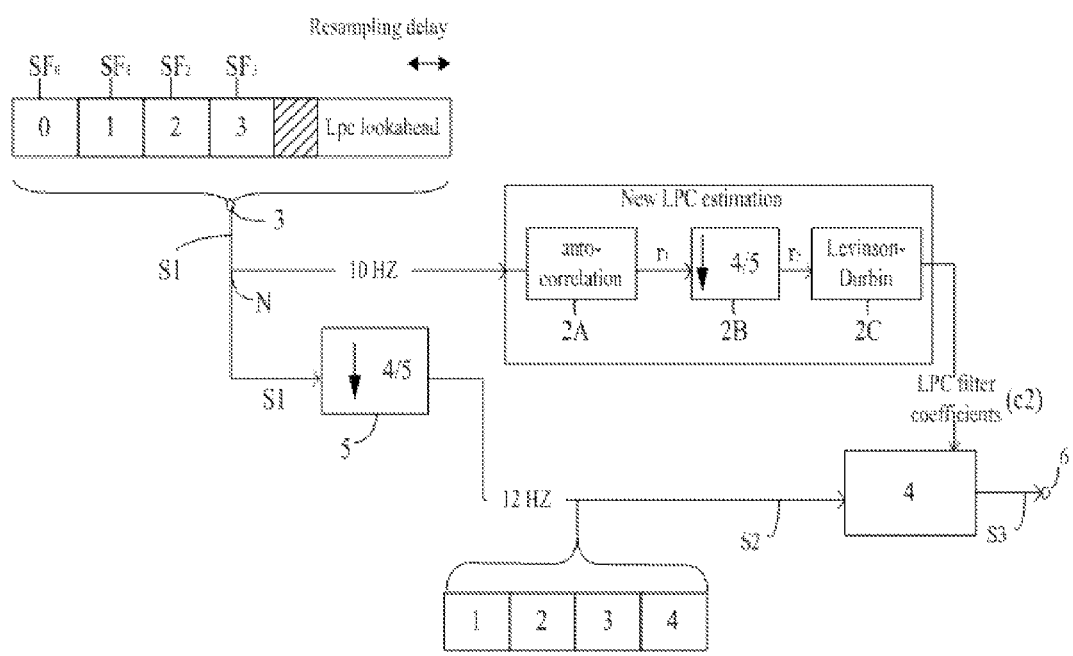
FIG. 4 shows an exemplary implementation and arrangement comprising an apparatus for providing signal processing coefficients according to the second aspect of the present invention.

FIG. 4 shows an arrangement comprising a signal processing device 1 according to a third aspect of the present invention comprising an apparatus 2 for providing signal processing coefficients according to the second aspect of the present invention. As can be seen in FIG. 4 the input signal S1 can comprise a sequence of frames F each consisting of one or several sub-frames SF. In the shown exemplary implementation each frame F comprises four sub-frames SF0, SF1, SF2, SF3. Each sub-frame SF can have a length of e.g. 5 ms wherein each sub-frame SF comprises for example 80 digital samples. This input signal S1 is applied to the input terminal 3 of the signal processing device 1 and split at a node N to an apparatus 2 for providing signal processing coefficients c2 according to the second aspect of the present invention and to a re-sampling filter 5 which performs in the exemplary implementation a downsampling with a downsampling factor of 4/5. The input signal sampling rate f1 of the input signal S1 is in the shown exemplary implementation 16 kHz. The sampling rate of the re-sampled signal S2 is in the shown exemplary implementation f2=12.8 kHz. The re-sampled signal S2 provided by the re-sampling filter 5 is applied in the shown exemplary implementation to the speech processing unit 4 which receives in the shown implementation LPC filter coefficients $C_2$ from the apparatus 2. The apparatus 2 for providing signal processing coefficients according to the second aspect of the present invention can comprise three stages as shown in FIG. 4, i.e. a computing unit 2A, a re-sampling unit 2B and a correlation unit 2C. The computing unit 2A computes a correlation or covariance function based on the received input signal S1 at the input signal sampling rate f1=16 kHz to provide correlation or covariance coefficients r1. The re-sampling unit 2B which is in the shown exemplary implementation a downsampling filter having a downsampling ratio of 4/5 is applied on these correlation or covariance coefficients r1. The re-sampling unit 2B provides the correlation or covariance coefficients r2 at the predetermined signal processing sampling rate f2. The calculation unit 2C calculates the signal processing coefficients c2 which are formed e.g. by LPC filter coefficients in the shown exemplary implementation. These signal processing coefficients c2 are calculated by the calculation unit 2C based on the re-sampled correlation or covariance coefficients r2 at the predetermined signal processing sampling rate f2. The calculated LPC filter coefficients c2 can be applied in a possible implementation to an LPC filter provided within the speech processing unit 4. The speech processing unit 4 can be formed for example by a speech encoder performing a speech encoding of the re-sampled input signal S2 applied to the speech processing unit 4 by the re-sampling filter 5.

Figure 1:
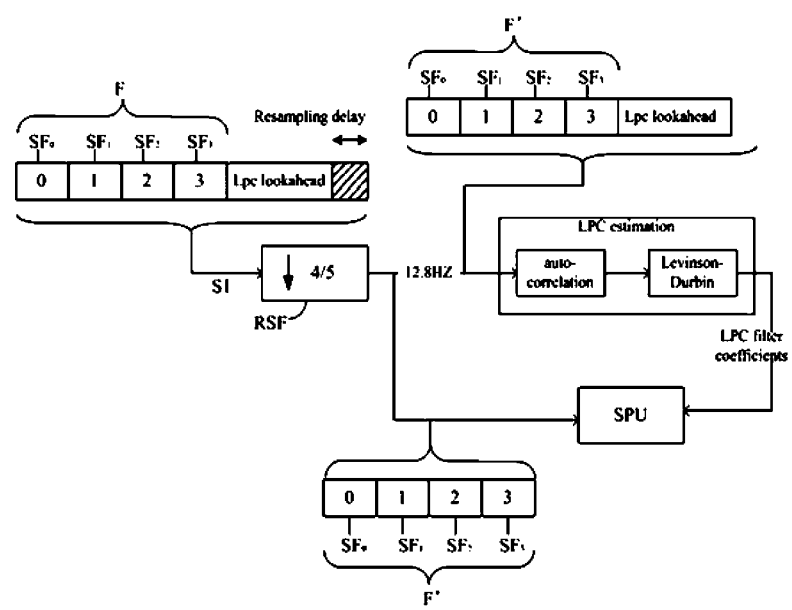
FIG. 1 shows a conventional arrangement for providing signal processing coefficients for a speech processing unit.

As illustrated in FIG. 4 the re-sampling delay (hatched area representing the re-sampling delay shifted—compared to FIG. 1—into the LPC look-ahead portion) caused by the re-sampling filter 5 is absorbed into the look-ahead since the LPC estimation of the apparatus 2 is done on the 16 kHz auto-correlation signal. The re-sampling delay which is usually lower than look-ahead delay is introduced in parallel to the look-ahead and not in addition.

Figure 5:
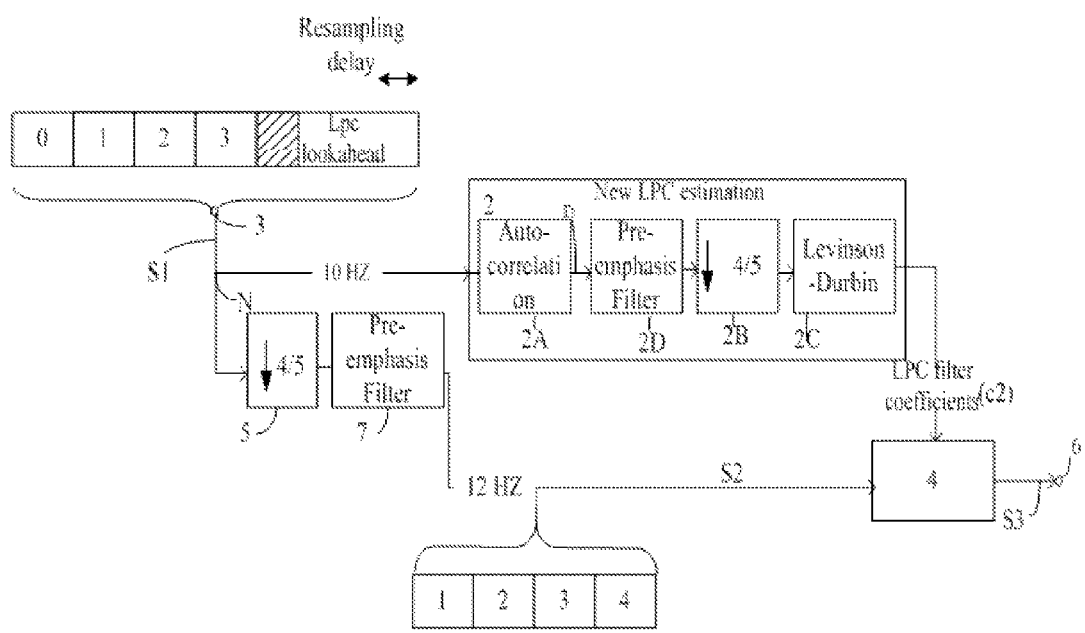
FIG. 5 shows a block diagram for a further possible implementation of an arrangement comprising an apparatus for providing signal processing coefficients according to the second aspect of the present invention.

FIG. 5 shows a further possible implementation of a signal processing device 1 having an apparatus 2 for providing signal processing coefficients according to the second aspect of the present invention. The shown implementation is similar to the implementation in FIG. 4, however, the apparatus 2 comprises in the shown exemplary implementation also a pre-emphasis filter 2D which is arranged between the computing unit 2A and the re-sampling unit 2B. Furthermore, the output signal of the re-sampling filter 5 is also applied to a corresponding pre-emphasis filter 7 before the re-sampled signal S2 is applied to the speech processing unit 4. The Pre-emphasis filter 7 can be provided for improving the speech quality of the signal. Accordingly, in the implementation as shown in FIG. 5 the calculated computer correlation or covariance coefficients r1 are filtered by a pre-emphasis filter 2D before being re-sampled by the re-sampling unit 2B. For the pre-emphasis filter 7 as shown in FIG. 5 a corresponding pre-emphasis filter stage 2D is provided for filtering the correlation or covariance coefficients r1 computed by the computing unit 2A. The pre-filter stage 2D and the re-sampling unit 2B can be integrated in a possible implementation into a single filter. In this specific embodiment the pre-emphasis filter 2D and the re-sampling unit 2B comprise one single filter. With the arrangement shown in FIG. 5 a phase of the auto-correlation is preserved. Accordingly, the re-sampling unit 2B can be formed by a zero phase re-sampling filter. This zero phase filter can be in a possible implementation a two-pass filter. In an alternative implementation the zero phase re-sampling filter 2B is a linear phase re-sampling filter with recentering of delay, i.e. a maximal auto-correlation is zero. Furthermore, it is possible that the zero phase re-sampling filter is formed by a sine interpolation filter.

As can be seen in FIGS. 4 and 5, the input signal S1 provided to the apparatus 2 comprises, for example, an actual signal portion, e.g. an actual frame F, and a lookahead portion. The re-sampling filter 5 is adapted to resample the actual signal portion of the input signal S1 and a re-sampling portion (hatched area) of the input signal S1.

Figure 6:
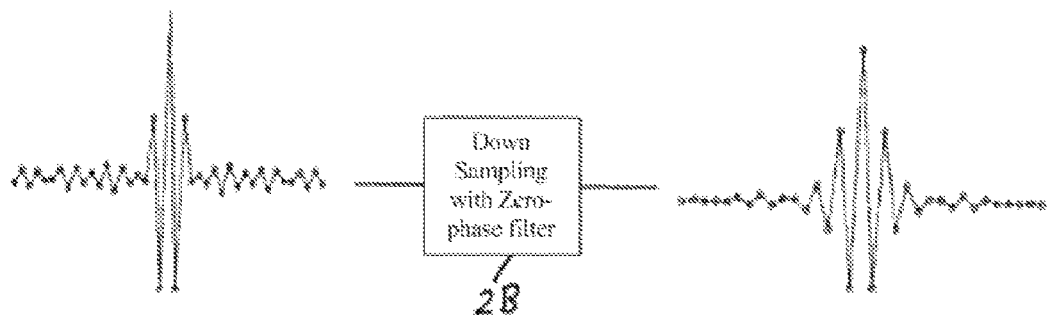
FIG. 6 shows a diagram for illustrating the functionality of a zero phase re-sampling filter as employed by an apparatus for providing signal processing coefficients according to the second aspect of the present invention.

FIG. 6 illustrates the re-sampling unit 2B formed by a zero phase re-sampling filter wherein a downsampling of the computed correlation or covariance coefficients r1 is performed. The re-sampling reconstructs the negative part by using symmetry of auto-correlation. Accordingly, the negative values of auto-correlations are obtained by using symmetry as illustrated in FIG. 6.

Zero phase filtering can be performed by:

a two pass filter: considering $x_n$ being the correlation, for all low pass filter (even not a zero phase filtering) $x_n$ is first filtered in the forward direction to obtain $y_n$. Then $y_n$ is filtered in backward direction (time reserved order) to obtain the output 4.

$$y_n = h * x(t)$$

$$z_n = h * y_{-n}.$$

Finally, the filtered correlation is obtained by z-n.

or by linear phase re-sampling filter with recentering of delay (i.e. max autocorrelation need always to be at zero), or by Sin c interpolation or spline interpolation or other kind of interpolation.

For Sin c interpolation the function sin c(x) is defined by sin c(x)=sin(x)/x for x≠0, with sin c(0)=1. The sine interpolation formula is defined as:

$$x(t) \sum_{n}^{\infty} = \infty x_n sinc\left(\frac{n}{T}(t - nT)\right),$$

$$n = -\infty$$

where T is the sampling period used to determine xn from the original signal, and x(t) is the reconstructed signal.

Alternatively a spline interpolation can be performed in the field of numerical analysis, spline interpolation is a form of interpolation where the interpolant is a special type of piecewise polynomial called a spline.

Given n+1 distinct knots xi such that:

$$x0 < x1 < \ldots < xn-1 < xn$$

with n+1 knot values yi, a spline function of degree n can be calculated:

$$S(x) = \begin{cases} S_0(x) & x\varepsilon[x_0, x_1] \\ S_1(x) & x\varepsilon[x_1, x_2] \\ \vdots \\ S_{n-1}(x) & x\varepsilon[x_{n-1}, x_n] \end{cases}$$

where each Si(x) is a polynomial of degree k.

Linear spline interpolation is the simplest form of spline interpolation and is equivalent to linear interpolation. The data points are graphically connected by straight lines:

$$S_i(x) = y_i + \frac{y_{i+1} - y_i}{x_{i+1} - x_i}(x - x_i).$$

Figure 9:
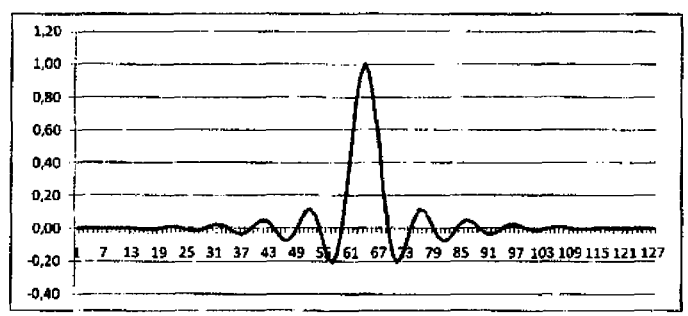
FIG. 9 shows a diagram for illustrating having a zero phase filter as employed by an exemplary implementation of the apparatus according to the second aspect of the present invention.

For example a filter H1 having a characteristic as shown in FIG. 9 is a 127 order zero phase filter. As shown in the FIG. 9 it is symmetric and the maximum point is at the middle.

The re-sampling filter can be combined with a pre-emphasis filter.

$$H_{comb} = H * H_{pre}$$

Where Hcomb is the characteristic of the combined filter, H is the characteristic of the re-sampling filter, Hpre is the characteristic of the pre-emphasis filter and operator "*" is the convolution operator.

There are many possible kinds of pre-emphasis filters which can be used.

An exemplary characteristic of the pre-emphasis filter is:

$$H\text{pre}1 = [-0.68, 0, 0, 0, 0, 1.4624, 0, 0, 0, 0, -0.68].$$

Another example of the characteristic of the pre-emphasis filter is:

$$H\text{pre}2 = [-0.68, 1.4624, -0.68].$$

$$H\text{comb}1 = H1 * H\text{pre}1$$

Figure 10:
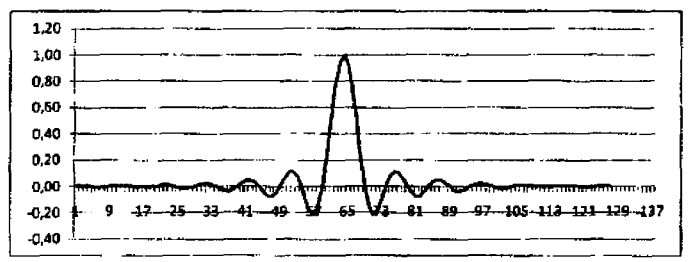
FIG. 10 shows as further diagram for illustrating a zero phase filter as employed by an exemplary embodiment of the apparatus according to the second aspect of the present invention.

Hcomb1 is e.g. a 137 order filter, which is also a zero phase filter having a characteristic as shown in FIG. 10.

The method and apparatus for providing signal processing coefficients can reduce the re-sampling filter delay caused by the re-sampling filter 5 which is usually introduced sequentially in the auto-correlation/correlation/covariance computation. The method and apparatus for providing signal processing coefficients can be applied for different sampling frequencies, for instance wideband WB (50-7,000 Hz) with a 16 kHz sampling frequency or super wideband SWB (50-14,000 Hz) with a 32 kHz sampling frequency or full band FB with a sampling frequency of 48 kHz. The method for providing signal processing coefficients can be applied also to other signal processing involving the computation of an auto-correlation or covariance function. In a possible implementation the processing involving the computation of correlation/covariance can be performed in a downsampled domain. For instance, an open loop pitch search which is also a step in the CELP codec can be performed on the original signal and not on the downsampled signal.

Figure 7:
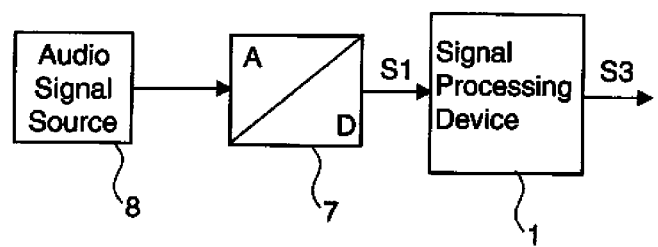
FIG. 7 shows a block diagram for illustrating an arrangement comprising a signal processing device according to a third aspect of the present invention.

FIG. 7 shows a block diagram illustrating the use of a signal processing device 1 according to a third aspect of the present invention. In this exemplary embodiment a signal processing device 1 receives the input audio signal S1 from an analogue digital converter 7 which converts an analogue audio signal into a digital signal and samples, for example, the analogue signal at the input signal sampling rate f1. The analogue to digital converter 7 is connected to an audio signal source 8 such as a microphone.

Figure 8:
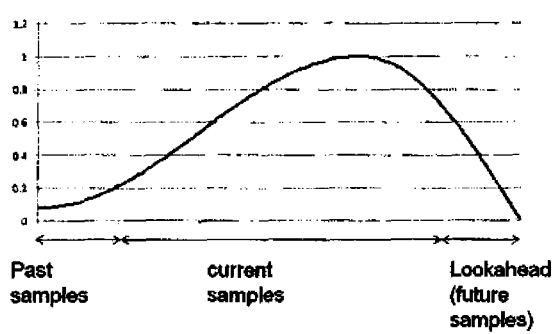
FIG. 8 shows a diagram of an exemplary window amplitude curve as employed by an apparatus for providing signal processing coefficients according to the second aspect of the present invention.

FIG. 8 shows an exemplary window amplitude curve which can be used by a windowing unit within a computing unit 2A of the apparatus 2 for providing signal processing coefficients. The shown windowing curve can be applied to the received input signal S1 before auto-correlation is applied. The windowing curve is provided for current samples of the respective frame F as well as for past samples and future samples forming the look-ahead as shown in FIG. 8. In other words, in certain embodiments the window function shown in FIG. 8 or similar window functions are applied to a previous signal portion, to a current or actual signal portion and to a look-ahead portion of the input signal, wherein a current or actual frame F forms the current or actual signal portion.

The processing of the signal processing device 1 can be performed by hardwired units or by using corresponding signal processing programs. The method for providing signal processing coefficients for processing the input signal S1 can be implemented by a signal processing program comprising corresponding instructions for processing the signal as well. Such a program for providing signal processing coefficients can be stored in a program memory or a data carrier. The configuration parameters such as the configurable re-sampling factor employed by the re-sampling unit 2B can be configured by means of a configuration interface of the signal processing device 1.

What is claimed is:

1. A method for providing signal processing coefficients for processing an input signal at a predetermined signal processing sampling rate, wherein the input signal is received at an input signal sampling rate, the method comprising:
   computing a correlation or covariance function based on the received input signal at the input signal sampling rate to provide first correlation or covariance coefficients at the input signal sampling rate, wherein the input signal comprises an audio signal;
   re-sampling the computed first correlation or covariance coefficients having the input signal sampling rate to provide second correlation or covariance coefficients at the predetermined signal processing sampling rate;
   calculating the signal processing coefficients based on the second correlation or covariance coefficients at the predetermined signal processing sampling rate; and
   coding a re-sampled input signal using the calculated signal processing coefficients, wherein the re-sampled input signal is the input signal re-sampled at a second input signal sampling rate.

2. The method according to claim 1, wherein, the received input signal comprises an actual signal portion and a look-ahead signal portion, wherein the calculating the signal processing coefficients comprises calculating the signal processing coefficients for the actual signal portion, and wherein the computed first correlation or covariance coefficients and the re-sampled second correlation or covariance coefficients comprise the actual signal portion and the look-ahead signal portion.

3. The method according to claim 1, wherein the signal processing coefficients comprise Linear Predictive Coding (LPC) filter coefficients or a pitch lag of the input signal.

4. The method according to claim 3, wherein the LPC filter coefficients are calculated by a filter coefficient calculating unit performing a filter coefficient calculation algorithm comprising a Levinson-Durbin algorithm or a Burg algorithm, and wherein the calculated LPC filter coefficients are provided to adapt a linear prediction coding (LPC) filter, used by a speech processing unit for performing a speech processing function to the re-sampled input signal.

5. The method according to claim 4, wherein the speech processing unit is formed by a Code Exited Linear Prediction (CELP) encoder or a Transform Coded Excitation (TCX) encoder.

6. The method according to claim 1, wherein the re-sampling is performed by a re-sampling unit with a re-sampling factor being formed by a ratio between the predetermined signal processing sampling rate and the input signal sampling rate, wherein the re-sampling unit performs a downsampling or an upsampling of the received input signal with the re-sampling factor, and wherein the re-sampling factor is a fixed or configurable re-sampling factor.

7. The method according to claim 6, wherein the configurable re-sampling factor is selected from a group of downsampling factors comprising $$4/15, 2/5, 4/5, 1/6, 1/4, 1/2.$$

8. The method according to claim 6, wherein the re-sampling unit is formed by a zero phase re-sampling filter.

9. The method according to claim 6, wherein the computed correlation or covariance coefficients are filtered by a pre-emphasis filter before being re-sampled by the re-sampling unit.

10. The method according to claim 1, wherein the received input signal is a digital audio signal comprising signal frames, wherein each of the signal frames consists of a predetermined number of samples.

11. An apparatus for providing signal processing coefficients for processing an input signal at a predetermined signal processing sampling rate, the apparatus comprising:
   a transducer for receiving the input signal, wherein the input signal comprises an audio signal;
   a non-transitory computer-readable storage medium including computer-executable instructions for causing the apparatus to perform the method comprising:
      computing a correlation or covariance function based on the received input signal at an input signal sampling rate to provide first correlation or covariance coefficients at the input signal sampling rate,
      re-sampling the computed first correlation or covariance coefficients having the input signal sampling rate to provide second correlation or covariance coefficients at the predetermined signal processing sampling rate,
      calculating the signal processing coefficients based on the second correlation or covariance coefficients at the predetermined signal processing sampling rate, and
   coding a re-sampled input signal using the calculated signal processing coefficients, wherein the re-sampled input signal is the input signal re-sampled at a second input signal sampling rate.

12. The apparatus according to claim 11, wherein the non-transitory computer-readable storage medium further includes instructions comprising calculating at least one of the group consisting of (a) Linear Predictive Coding (LPC) filter coefficients and (b) a pitch lag, based on the second calculated correlation or covariance coefficients.

13. A signal processing device comprising:
   a non-transitory computer-readable storage medium including computer-executable instructions for causing the device to perform the method comprising:
      computing a correlation or covariance function based on an input signal at an input signal sampling rate to provide first correlation or covariance coefficients at the input signal sampling rate wherein the input signal comprises an audio signal,
      re-sampling the computed first correlation or covariance coefficients having the input signal sampling rate to provide second correlation or covariance coefficients at the predetermined signal processing sampling rate, calculating the signal processing coefficients based on the second correlation or covariance coefficients at the predetermined signal processing sampling rate, and coding a re-sampled input signal using the calculated signal processing coefficients, wherein the re-sampled input signal is the input signal re-sampled at a second input signal sampling rate.

14. The signal processing device according to claim 13, wherein the performing instructions further comprise performing a speech processing function to said re-sampled input signal in response to at least one of (a) calculated Linear Predictive Coding (LPC) filter coefficients and (b) a calculated pitch lag.

15. The signal processing device according to claim 13, wherein the non-transitory computer-readable storage medium further includes instructions comprising receiving a digital audio signal as the input signal, wherein the digital audio signal is provided by an audio signal source connected to the signal processing device.

* * * * *

UNITED STATES PATENT AND TRADEMARK OFFICE
CERTIFICATE OF CORRECTION

PATENT NO.        : 9,800,453 B2
APPLICATION NO.   : 13/957078
DATED             : October 24, 2017
INVENTOR(S)       : Taleb et al.

It is certified that error appears in the above-identified patent and that said Letters Patent is hereby corrected as shown below:

On the Title Page

Page 2, Column 2, item (56) "Other Publications," the final reference, Kroon et al., title should read -- "Pitch Predictors With High Temporal Resolution" --.

Signed and Sealed this
Fifteenth Day of May, 2018

Andrei Iancu
*Director of the United States Patent and Trademark Office*